Oct. 2, 1951     D. L. COLE     2,569,454
SLIDE RULE
Filed Jan. 30, 1948
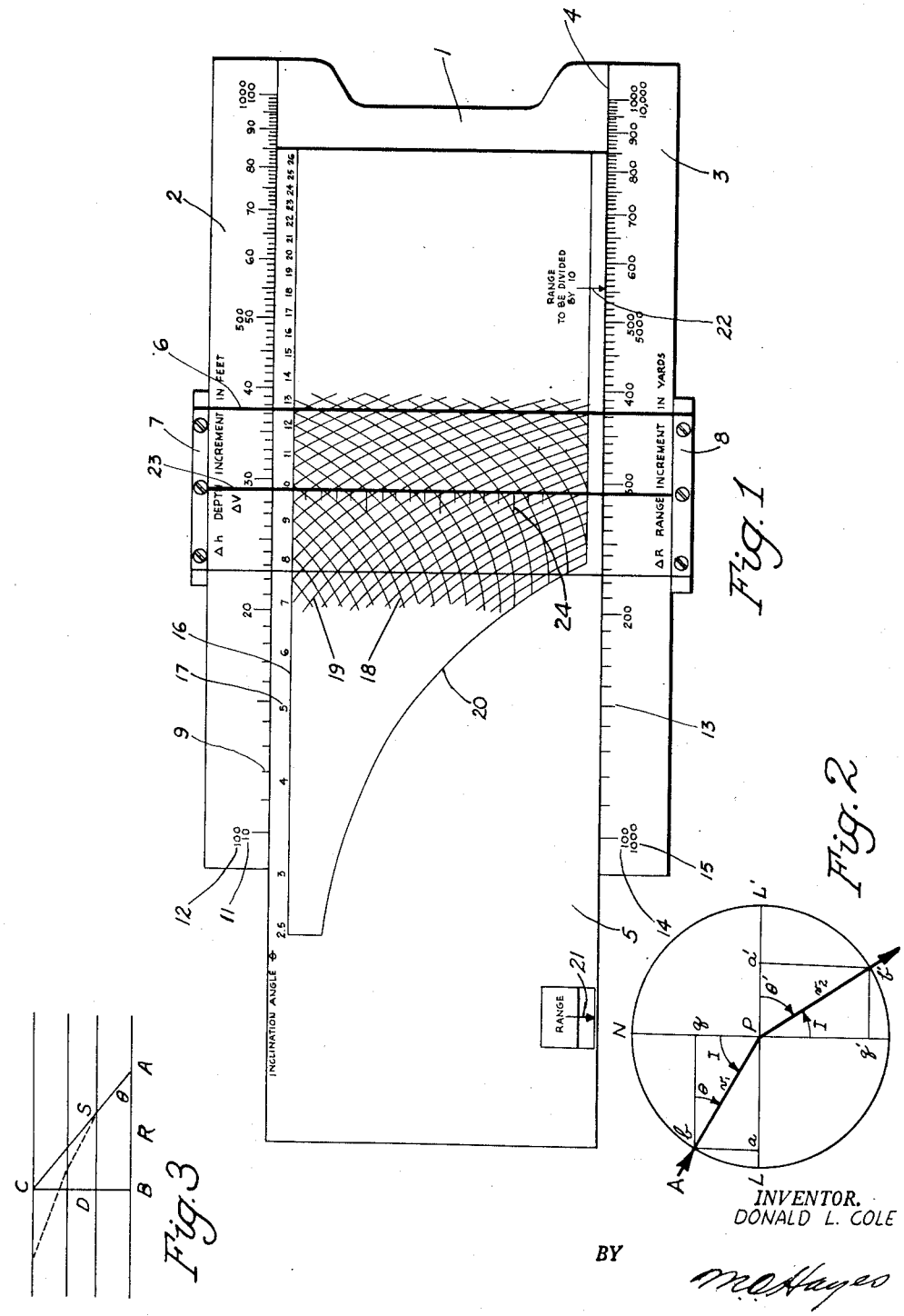
INVENTOR.
DONALD L. COLE
BY
*M. O. Hayes*
ATTORNEY Patented Oct. 2, 1951

2,569,454

UNITED STATES PATENT OFFICE 2,569,454

SLIDE RULE

Donald L. Cole, Groton, Conn.

Application January 30, 1948, Serial No. 5,474

3 Claims. (Cl. 235—70)

(Granted under the act of March 3, 1883, as amended April 30, 1928; 370 O. G. 757)

The present invention concerns a device for computing the range of a target relative to an observer and particularly concerns a slide rule for computing the horizontal range of a marine target relative to a marine observer from observed sound echo data.

In marine operations it is necessary to make determinations of the position of a target relative to an observer from under water observations. One system for making such determinations, known as echo ranging, embodies projection from the observer toward the target of a sound beam, which is reflected by the target back to the observer. Data observed include elapsed time between projection of the sound and return thereof after reflection; the angle of elevation or depression made by the sound path with a horizontal plane of reference at the point of observation; and the azimuth of the target. Thus, in so-called anti-submarine warfare, it is customary for an observing surface ship to project a sound beam toward a submerged target and to measure the elapsed echo time, angle of depression, and azimuth. In another type of warfare, it is customary for an observing submarine to project a sound beam toward a surface target and to measure the elapsed echo time, angle of elevation, and azimuth by a procedure known as vertical triangulation listening ranging.

From the observed data in sound echo ranging of this type it is possible to compute the unknown horizontal range of the target. This is accomplished by means of triangulation. To illustrate, the case of a submarine making observations on a surface target vessel is considered. In Figure 3, A = observing submarine
C = surface target
D = depth of submarine in feet (observed)
S = distance (unknown) from submarine to target along sound beam path
R = horizontal range in yards (unknown, to be computed)
$\theta$ = Angle of elevation (observed) of sound beam path relative to horizontal plane at submarine.

Solution of the problem for the unknown values R and S is readily accomplished if it is assumed that the sound beam follows a straight path between A and C along line S and that the sound travels at constant velocity. From these assumptions, $$S = \frac{\text{elapsed time (observed)}}{2} \times \text{speed of sound}$$

Also the unknown horizontal range R is computed from the observed submarine depth D and the observed angle of elevation $\theta$:

$$R \text{ (yards)} = \frac{D \text{ (feet)}}{3} \times \frac{1}{\tan \theta}$$

Under actual operating conditions the assumption that the sound beam path lies along a straight line is usually not warranted and under most conditions refraction of the sound beam in the water occurs as indicated in dotted lines in the diagram. Typically, the water body occurs in substantially horizontal layers of different sound-transmitting characteristics so that a sound beam passing through the layers is refracted in passage from one layer to another. As a result of such refraction, value of the horizontal range R computed in the manner above indicated is not correct and it is necessary to modify the computation to take into account the change in angle $\theta$ and range that occurs with refraction.

It has been found that the change in angle $\theta$ that occurs with refraction of the sound beam in passing through the water body either toward or away from the surface can be determined by measurement of the change in velocity of sound in the water body and that angle $\theta$ varies with the sound velocity. This can be justified by Snell's law of refraction considered in connection with Figure 2. In the diagram a sound beam A is considered passing downward through a horizontal interface LL' of two layers of a water body and refracted at point P. The circle is of unit radius for convenience. NN' is normal to LL'. Lines $ab$ and $a'b'$ are parallel to NN' and the lines $bq$ and $q'b'$ are parallel to LL'. Also $v_1$ equals the sound velocity above LL' and $v_2$ equals the sound velocity below LL'. I is the angle of incidence; I' is the angle of refraction. $\theta$ is the observed angle of depression; $\theta'$ is the refracted angle of depression. From Snell's law of refraction:

$$\frac{v_1}{v_2} = \frac{\sin I}{\sin I'} = \frac{bq}{b'q'} = \frac{bq}{a'P}$$

also $$\frac{bq}{a'P} = \frac{\cos \theta}{\cos \theta'}$$

hence $$\frac{v_1}{v_2} = \frac{\cos \theta}{\cos \theta'}$$

Thus angle $\theta$ varies with the sound velocity. From the equation $$R \text{ (yards)} = \frac{D \text{ (feet)}}{3} \times \frac{1}{\tan \theta}$$

it is seen that horizontal range R varies with angle $\theta$ and therefore horizontal range R varies with sound velocity; measurement of sound velocity is therefore a factor in computing horizontal range. Thus when a sound beam passes through layers of water having different sound-transmitting characteristics, which cause refraction of the beam, it is possible by making observations of the speed of sound in the different layers to include proper refraction corrections in computing the horizontal range.

Applicant has found that instead of using sound velocity as the water characteristic to be observed there are other characteristics that are observable and affect horizontal range determination. One such characteristic is the thermal structure of the water; which often is found in substantially horizontal layers; the water may have a negative temperature gradient (decrease in temperature with increase in depth below the surface); or there may exist a positive temperature gradient (increase in temperature with increase in depth below the surface); or there may exist a mixed layer of water above either a negative or positive gradient layer; or there may exist isothermal conditions (uniform temperature with change in depth below the surface). Another characteristic is the surface temperature of the water. Another characteristic is the salinity and density of the water. Data obtained by observation of these characteristics for a particular body of water can be used in determining the refraction of the sound beam and computing the horizontal range R. This method of computation has the disadvantage of requiring observations of several different characteristics and inclusion of the several different observations in the computation.

Computation of the horizontal range has heretofore been a cumbersome process involving substitution of observed values in a formula and necessitating the use of numerous graphs representing the functional relationship between variation of range with variation in characteristics of the water body.

Applicant has overcome the difficulties of computation by providing a slide rule of simple construction for computing the value of horizontal range. A first fixed scale is graduated in terms of depth (of an observer). A second fixed scale is graduated in terms of range (of target). A sliding scale is graduated in terms of angle of elevation (angle $\theta$) and registers with the first fixed scale. The lower edge of the slide is provided with an index mark. The face of the slide is inscribed with curves representing change in sound velocity with change in angle $\theta$ (and hence change in range). The cursor is graduated across the face of the slide in terms of change in velocity, $\Delta V$.

An object of the invention is to provide a device for computing from observed data the range of a target relative to an observer.

Another object is to provide a slide rule for computing the range of a marine target relative to a marine observer from observed sound echo data.

Another object is to provide a slide rule for computing the range of a marine target relative to a marine observer from sound echo data in which the computation takes into account refraction of the sound beam.

Another object is to provide a slide rule for computing range of a target relative to an observer from sound echo data in which the slide rule is arranged to take into account refraction of the sound beam between layers of water having different sound-transmission characteristics.

Another object is to provide a slide rule for computing range of a target relative to an observer from sound echo data in which the slide rule is arranged to take into account refraction of the sound beam between layers of water having different sound-velocity characteristics.

Another object is to provide a slide rule for computing the range of a marine target relative to a marine observer from sound echo data in which a first fixed scale is graduated in terms of depth (of an observer); a second fixed scale is graduated in terms of range (of target); a sliding scale is graduated in terms of angle of elevation (angle $\theta$) and registers with the first fixed scale; the lower edge of the slide is provided with an index mark; the face of the slide is inscribed with curves representing change in sound velocity with change in angle $\theta$ (and hence change in range); and a cursor is graduated across the face of the slide in terms of change in velocity, $\Delta V$.

Further objects and advantages of this invention as well as its construction, arrangement and operation will be apparent from the following description and claims in connection with the accompanying drawing in which the figure is a plan view of a preferred embodiment of the invention.

In the figure is shown a body 1 having spaced rails 2 and 3, which define a channel 4 therebetween. A slide 5 is mounted in channel 4 for sliding movement between rails 2 and 3. Mounted transversely across slide 5 and across rails 2 and 3 is a cursor 6 provided with end guides 7 and 8 for engaging the outer surfaces of rails 2 and 3 to guide cursor 6 for sliding movement along rails 2 and 3. The surfaces of rails 2 and 3 and of slide 5 are formed of opaque material capable of being inscribed with markings. The portion of cursor 6 extending across rails 2 and 3 and slide 5 is transparent and capable of being inscribed with markings.

Rail 2 is inscribed with a scale 9 graduated to represent log depth in terms of linear feet. Scale 9 is provided with a first series 11 of identifying numbers from 10 to 100 and with a second series 12 of identifying numbers from 100 to 1,000. The dual set of numbers is used in order to provide a slide rule of minimum length.

Rail 3 is inscribed with a scale 13 graduated to represent log range in terms of linear yards. Scale 13 is provided with a first series 14 of identifying numbers from 100 to 1,000 and a second series 15 of identifying numbers from 1,000 to 10,000. Series 14 of scale 13 is for use with series 11 of scale 9 and series 15 of scale 13 is for use with series 12 of scale 9. Scales 9 and 13 are of equal length and are aligned transversely of body 1.

Slide 5 adjacent rail 2 is inscribed with a scale 16 graduated to represent log tan inclination angle $\theta$ and is provided with a series 17 of identifying numbers from 2.5 to 26. From the graduations of scale 16 as points of origin, there are plotted a series of curves 18 and a second superimposed series of curves 19. Curves 18 slope downwardly and to the left from the points of origin and represent log tan $\theta$ plotted as abscissa points against velocity difference plotted as ordinate points. Velocity difference increases in a downward direction and log tan $\theta$ increases toward the right. Curves 18 represent a positive gradient condition in which increases in velocity The invention described herein may be manufactured and used by or for the Government of the United States of America for governmental purposes without the payment of any royalties thereon or therefor.

What is claimed is:

1. A slide rule comprising a body member and a slide member, a first scale on said body member and a second scale on said slide member adapted to register with the first scale, graduations on the first scale representing log depth of an observer, graduations on the second scale representing log tangent of the angle of inclination of a target relative to the observer, a third scale on one of said members, graduations on the third scale representing log range of the target, an index on the other of said members adapted for registration with the third scale, curves inscribed on the slide representing change in log range of the target with change in velocity of an echo beam between the observer and target, a cursor, and graduations on the cursor representing change in velocity and adapted for registration with said curves, said curves having their respective points of origin at respective ones of said graduations and said cursor being slidable over said body member and said slide member.

2. A slide rule comprising a body member and a slide member, a first scale on said body member and a second scale on said slide member adapted to register with the first scale, graduations on the first scale representing log depth of an observer, graduations on the second scale representing log tangent of the angle of inclination of a target relative to the observer, a third scale on one of said members, graduations on the third scale representing log range of the target, an index on the other of said members adapted for registration with the third scale, a first set of curves inscribed on the slide representing change in log tan average angle of inclination plotted against increasing changes in velocity of a refracted echo beam between the observer and target, and a second set of curves superimposed on the first set of curves with common points of origin and representing changes in log tan average angle of inclination plotted against decreasing change in velocity of a refracted echo beam between the observer and target, said curves having their respective points of origin at respective ones of said graduations.

3. A slide rule comprising a body member and a slide member, a first scale on said body member and a second scale on said slide member adapted to register with the first scale, graduations on the first scale representing log depth of an observer, graduations on the second scale representing log tangent of the angle of inclination of a target relative to the observer, a third scale on one of said members, graduations on the third scale representing log range of the target, an index on the other of said members adapted for registration with the third scale, a first set of curves inscribed on the slide representing change in log tan average angle of inclination plotted against increasing change in velocity of a refracted echo beam between the observer and target, and a second set of curves superimposed on the first set of curves with common points of origin and representing changes in log tan average angle of inclination plotted against decreasing change in velocity of a refracted echo beam, a cursor, and graduations on the cursor representing change in velocity and adapted for registration with said curves, said curves having their respective points of origin at respective ones of said graduations and said cursor being slidable over said body member and said slide member.

DONALD L. COLE.

REFERENCES CITED

The following references are of record in the file of this patent:

UNITED STATES PATENTS

| Number | Name | Date |
|---|---|---|
| 1,568,475 | Schwanda | Jan. 5, 1926 |
| 2,219,429 | Osterberg | Oct. 29, 1940 |

OTHER REFERENCES

Pages 19-29 of "Special Slide Rules," by J. N. Arnold, published as Engineering Bulletin, Extension Series No. 32, by the Engineering Extension Department of Purdue University, La Fayette, Indiana, September 1, 1933.

Page 496 of "Charts and Graphs," by Karl G. Darsten, published by Prentice-Hall, Inc., New York in 1923.

difference downwardly from the surface of the water body is accompanied by decrease in log tan $\theta$. Curves 19 slope downwardly and to the right from the points of origin. Curves 19 represent a negative gradient condition.

A pair of index arrows 21 and 22 are provided at the edge of slide 5 adjacent scale 13. Arrows 21 and 22 are spaced a distance equal to the length of scales 9 and 13. Arrows 21 and 22 are positioned relative to scale 16 to represent a constant of log 3.

Cursor 6 is inscribed with a hairline 23 provided with graduations 24 representing increase in velocity difference from zero value at scale 16 to maximum value adjacent scale 13.

Curves 18 and 19 are preferably constructed from data that are mathematically computed by use of Snell's law of refraction. If desired, however, the curves can be constructed directly from data obtained in actual sound echo operations or by use of empirical formulas derived from such data.

There is provided for curves 18 and 19 a limiting boundary 20 since it is found in operation that curves extending beyond the boundary are impracticable. Curves in the area beyond boundary 20 have a relatively large change in ordinate for a relatively small change in abscissa and thus provide inaccurate results in use of the slide rule. Interpolation of values is made between the various curves 18 and the various curves 19 in use of the slide rule.

Instead of curves 18 and 19, which represent change in log tan $\theta$ with change in velocity, other curves may be inscribed upon slide 5. For example, the curves can be constructed to represent change in log cot $\theta$ with change in velocity. Or curves can be constructed which, instead of being based upon change in sound velocity, are based upon changes in characteristics of the water body such as change in thermal structure, surface temperature or salinity. Such characteristics can be observed directly in actual sound echo operations. If such alternate curves are used, scales 9 and 13 are suitably modified so that the slide rule will be operable for computing the desired quantity.

The slide rule is constructed to solve the basic equation stated hereinbefore:

$$R \text{ (yards)} = \frac{D \text{(feet)}}{3} \times \frac{1}{\tan \theta}$$

This equation is logarithmically expressed:

$$\log R \text{(yards)} = \log D \text{(feet)} - \log \tan \theta - \log 3$$

The construction of the slide rule is such that the above equation can be solved without the use of curves 18 and 19 for the special condition of constant velocity of sound in the water body at all observed depths (temperature of the water body). For example, under this condition and in the case of a submerged observing submarine and a surface target vessel, this is accomplished for any particular set of observed data by selecting the appropriate graduation on scale 9 representing the observer's depth, bringing into registration therewith the appropriate graduation on scale 16 representing the observed inclination angle $\theta$ and reading the range (answer) on scale 13 where indicated by arrow 21 or arrow 22. This procedure subtracts from log D (on scale 9) the log tan $\theta$ (on scale 16) and also the constant log 3 (because of the position of arrows 21 and 22 relative to scale 16).

Under more usual conditions of operation illustrated in Figure 3, a sound beam in passing upward from A through water layers having different sound velocity characteristics follows the dotted line path which is not a straight line. Under these conditions tan $\theta$ changes with velocity change and in computing R by the above equation it is necessary to modify the value of log tan $\theta$ in order to compute the correct value of R. Such correction is introduced in operation of the slide rule by the use of curves 18 and 19 which represent log tan $\theta$ plotted as abscissa points against velocity difference plotted as ordinate points. The abscissa or change in log tan $\theta$ are components of the curves parallel to scale 13 and are thus the components used for correcting the computed range in scale 13. The velocity difference is the change in velocity of a sound beam from the entrance point to the exit point of any particular layer of the water body and the angle $\theta$ is the average angle for such layer calculated by adding the entrance and exit angles and dividing by 2. Curves 18 represent change in log tan $\theta$ for positive change or increase in velocity; curves 19 represent change in log tan $\theta$ for negative change or decrease in velocity. As seen from the equation above, an increase in log tan $\theta$ (with decrease in velocity) results in a decrease in actual range compared with apparent range; conversely a decrease in log tan $\theta$ (with increase in velocity) results in an increase in actual range compared with apparent range.

To illustrate use of the slide rule in solving for range of a surface target observed from a submerged submarine the case is considered of a submarine at a keel depth of 300 feet and having a hydrophone located 10 feet above the keel to provide a hydrophone depth of 290 feet. Observations indicate an increase in the velocity of sound of 65 feet per second from the water surface to the indicated depth. Sound echo observations indicate an angle of elevation, $\theta$, of 12°. Computation of horizontal range is accomplished as follows (see the figure):

Cursor 6 is adjusted until hairline 23 thereof is in registration with the graduation representing a depth of 290 feet on scale 9. Slide 5 is then adjusted until curve 18 (for positive or increasing velocity) from the graduation representing an origin angle $\theta$ of 12° on scale 16 intersects the cursor graduation representing velocity change of 65 feet per second at hairline 23. Arrow 22 indicates a range of 558 feet on scale 13 as the answer. This solution is for a single layer of water. If, however, there are other overlying layers of water, the process is repeated for each layer. In such case the new origin angle $\theta$ is determined by following a curve 19 from the above intersection back to scale 16 where an interpolated value (in the example) of 7° 45' is indicated. This procedure is justified since 12° and 7° 45' represent the inclination angles made by the sound beam at the boundaries of the water layer and their average value is represented at their point of intersection.

In the stated problem a positive or increasing value of velocity change was involved and curves 18 were used in solving for range. If a negative or decreasing value of velocity change is involved in a problem, curves 19 are used in solving for range.

It is to be understood that various modifications and changes may be made in this invention without departing from the spirit and scope thereof as set forth in the appended claims.